Patented May 28, 1946

2,400,876

UNITED STATES PATENT OFFICE 2,400,876

ORGANIC COMPOUNDS AND METHOD OF MAKING SAME

Morris H. Daskais and Ellis K. Fields, Chicago, Ill., assignors to Research Corporation, a corporation of New York No Drawing. Application January 16, 1943, Serial No. 472,598

8 Claims. (Cl. 260—566)

This invention relates to a new series of compounds, reaction products of alpha isonitroso carbonyl compounds and polyamines, and to methods of producing the same. It also relates to the use of these novel compounds for the stabilization of organic substances subject to deterioration by the action of oxygen and, in particular, to the stabilization and preservation of organic substances wherein the substances contain or are brought in contact with certain metals and their compounds which accelerate the oxidizing action and hasten the deterioration of the organic substances. These novel compounds are species of diketimines. They are especially useful for the preservation of oxidizable mineral hydrocarbons containing or in contact with certain metals and their compounds.

The invention will be fully understood from the following description, illustrated by specific examples of compounds and of their preparation.

Many organic substances such as gasoline, lubricating oils, sulfonated and sulfated oils, essential oils, fats, soaps, rubber, photographic developers, silk, wool, cellulose products and the like are subject to oxidation and consequent deterioration. Antioxidants are usually incorporated in these organic substances to retard to a considerable extent the reaction of these substances with oxygen. In the presence of even very minute amounts of certain metals and metallic compounds, especially copper, iron, chromium and lead, and their compounds, which appear to function as oxidation promoters when in contact with organic substances, the effect of antioxidants is decreased, and may be overcome entirely, so that the organic substances react with oxygen as rapidly as, if not more rapidly than, if an antioxidant were not present.

The diketimine compounds of the present invention suppress and neutralize the pro-oxidant effect of the metals and their compounds on organic substances and, when added to organic substances which contain an antioxidant and which may also contain or be brought in contact with these metals and their compounds, increase the efficiency of the antioxidant.

Only small amounts of these diketimine compounds are essential to accomplish this purpose, varying generally from about 0.005% to about ½ of 1%. Larger amounts can, of course, be used.

The amounts to be used are dependent, in part, upon the particular organic substance into which the compounds of the present invention are to be incorporated, the presence or absence of an antioxidant, the amount of pro-oxidant metal in the organic substance and the stability requirements of the treated organic substance. For most purposes, about 0.009% to about 0.25% is sufficient.

The compounds of our invention may be added to organic substances to be stabilized in any desired form. Thus they may be added in solid or liquid form, mixed with other addition agents, or dissolved in a solvent.

The use of metal deactivators for the purpose described herein is known; however, most of the compounds proposed for this purpose have not been particularly effective. The most effective ones heretofore proposed consist of the products of condensation of (a) one molecule of an aliphatic polyamine and two molecules of an ortho hydroxy aromatic aldehyde or ketone; and (b) one molecule of a polyamino compound and at least two molecules of a 1,3 or beta diketone. The diketimine compounds of the present invention are markedly superior in action to the prior art compounds and, in addition, they may be produced at a lesser cost.

The diketimines compounds of our invention are produced by reacting an alpha isonitroso carbonyl compound such as an alpha isonitroso ketone or substituted alpha isonitroso ketone with a polyamino compound in the proportion of at least two molecules of the former to one of the latter. The reaction may be brought about by mixing the reactants in a reaction vessel in the proportions stated, or in other proportions. In most cases the reaction takes place with vigor at room temperature, but gentle warming may be desirable and, perhaps, essential in some cases. The vigor of the reaction may be moderated by the use of one or more compounds which, preferably, are solvents for the reactants. It is not essential that the reactants be soluble in these solvents since the reaction will take place even where the reactants are suspended in the solvents. Examples of such solvents are water, methyl alcohol, ethyl alcohol, diethyl ether, diisopropyl ether, pyridine and the like. During the reaction, one molecule of water is eliminated for every primary amino group contained in the polyamino compound. In general, the resulting reaction products are white solids with a melting point above 100° C.

The alpha nitroso compounds in accordance with the present invention exist in tautomeric form and either or both of these tautomers may be used as a reactant. These tautomers have the following general formulae

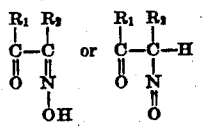

wherein $R_1$ and $R_2$ represent radicals selected from the group consisting of alkyl, aryl, aralkyl, acyl, carbalkoxy, cyclic or heterocyclic radicals, and wherein $R_2$ may also be hydrogen and where the group

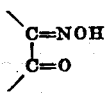

may occur as part of a chain or a cyclic or heterocyclic ring and wherein the carbon atoms of the $R_1$ and $R_2$ groups may be connected directly to each other or through an atom or group of atoms which may include C, O, N, S, etc.

Some examples of such compounds are alpha isonitroso methyl ethyl ketone, isonitroso acetone, alpha isonitroso camphor, alpha isonitroso acetoacetic esters, alpha isonitroso acetophenone, alpha isonitroso acetyl acetone, alpha isonitroso cyclohexanone, alpha isonitroso methyl propyl ketone, alpha isonitroso methyl amyl ketone, alpha isonitroso xylyl undecyl ketone, alpha isonitroso acetonaphthone, alpha isonitroso aceto pyridine, etc.

The polyamino compounds which may be used in accordance with the invention are aliphatic or aromatic di- and higher polyamines, preferably containing at least two primary amino groups attached directly to different carbon atoms of the said compound. The carbon chain of the said compound may contain other atoms such as nitrogen, oxygen or sulfur. The amino groups may be attached directly to different carbon atoms as already pointed out or to different carbon atoms of the carbon chain which are connected by nitrogen, oxygen or sulfur linkages.

Examples of such polyamino compounds are ethylene diamine, 1,2-propylene diamine, 1,3-propylene diamine, 3,4-hexane diamine, diethylene triamine, triethylene tetramine, tetraethylene pentamine, ortho phenylene diamine, 1,2-diamino cyclohexane, 1,3-diamino isopropanol, diamino diethyl ether, diamino diethyl sulfide, etc.

The following example is illustrative of the methods of preparing the novel compounds in accordance with the present invention. It is, of course, to be understood that our invention is not to be construed as limited to the proportions and details of the methods therein set forth since various modifications thereof will be apparent from the foregoing and are intended to be included within the scope of our invention as defined by the appended claims.

*Example.*—10 parts by weight of alpha isonitroso methyl ethyl ketone were dissolved in 20 parts by weight of diisopropyl ether in a Pyrex vessel and 3 parts by weight of ethylene diamine were added. The ingredients were mixed as by stirring at room temperature. The vessel was now heated to raise the temperature of the ingredients to about 70° C. to remove the solvent (diisopropyl ether) and thereupon a vigorous reaction ensued with the formation of the desired reaction product. When this reaction product was crystallized from acetone, it was a white solid having a melting point of 166° C.

The reaction which took place in the foregoing illustrative example may be represented by the following equation:

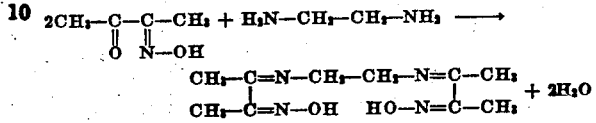

The following compounds were prepared in substantially the same manner as described above and, when tested in accordance with the present invention, were found to be particularly effective:

Di-(isonitroso acetone) ethylene diamine

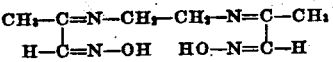

Di-(alpha isonitroso methyl ethyl ketone) ethylene diamine

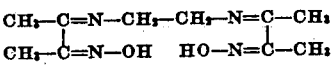

Di-(alpha isonitroso methyl ethyl ketone) propylene diamine

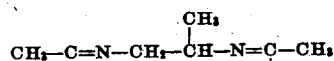

Di-(isonitroso acetone) diethylene triamine

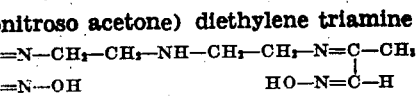

Di-(isonitroso acetone) triethylene tetramine

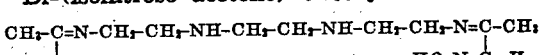

Di-(alpha isonitroso methyl ethyl ketone) diethylene triamine

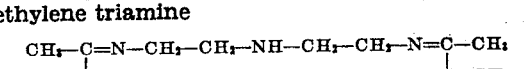

Di-(alpha isonitroso acetoacetic ester) ethylene diamine

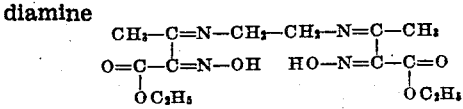

Di-(alpha isonitroso camphor) ethylene diamine

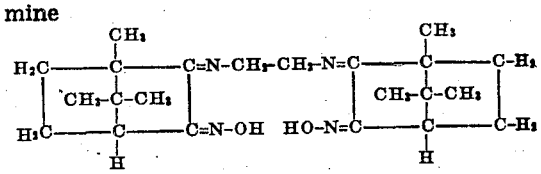

The compounds of our invention may also be prepared in solutions which are suitable for addition to the substances to be deactivated. For example: 101 parts by weight of alpha isonitroso methyl ethyl ketone were dissolved in 3000 parts by weight of benzene and 37 parts by weight of propylene diamine were added. Water began to form. After 4 hours the benzene solution was decanted from the water, dried over sodium sulfate, and filtered. The resulting benzene solution of di-(alpha isonitroso methyl ethyl ketone) propylene diamine was suitable for addition to hydrocarbon materials.

While all of the foregoing compounds are reaction products of two molecules of an isonitroso ketone and one molecule of a polyamino compound, our invention is not to be construed as limited to such compounds since our invention contemplates modified forms of such compounds as well as derivatives thereof. Thus, modified isonitroso ketone-polyamino reaction products in accordance with our invention may be produced by reacting one molecule of an ortho-hydroxy aldehyde or orthohydroxy ketone or one molecule of a 1,3-diketone and at least one molecule of an isonitroso ketone with one molecule of a polyamino compound. The following are examples of such compounds:

N-(alpha isonitroso methyl ethyl ketone)-N'-(ortho-hydroxy acetophenone)-ethylene diamine

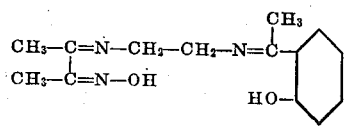

N-(alpha isonitroso methyl ethyl ketone)-N'-(acetyl acetone)-ethylene diamine

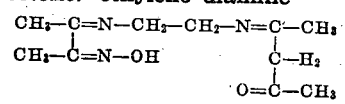

Derivatives of the isonitroso ketone-polyamino reaction products may readily be formed by reacting the reaction product with another organic compound, for example, with an acid chloride or ester such as stearoyl chloride, methyl stearate or ethyl stearate, to obtain an N-disubstituted amide. The reaction may be represented by the following equation:

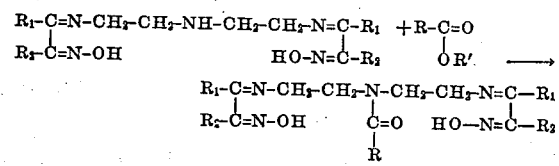

The N-disubstituted amide may also be synthesized, but not so conveniently, by reacting a polyamide containing a secondary amino group, which group contains a substituted acyl group such as a stearoyl group or a long chain alkyl group such as the octadecyl group, with the alpha isonitroso ketone as described above.

The compounds of our invention were tested on gasoline in accordance with A. S. T. M. method D525–41T for the gum stability of gasoline. The test gasoline contained an antioxidant, but no deactivator and had an induction period of 120 minutes. Just before the test 1 part per million of copper in the form of copper stearate was added to the gasoline, as well as the deactivator to be tested. The results of some tests are shown in Table I.

Table I

| Deactivator added 5 mg./50 cc. gasoline | Induction period, minutes |
|---|---|
| None | 15 |
| Di-(isonitroso acetone) diethylene triamine | 90 |
| Di-(alpha isonitroso methyl ethyl ketone) ethylene diamine | 108 |
| Di-(alpha isonitroso methyl ethyl ketone) diethylene triamine | 90 |
| Di-(alpha isonitroso acetoacetic ester) ethylene diamine | 90 |
| None | 15 |

The above table illustrates the effectiveness of the compounds of our invention in suppressing the pro-oxidant effect of copper on hydrocarbons and the results obtained are representative of those obtained with the other novel compounds in accordance with the present invention and with other metals and their compounds which promote oxidation in hydrocarbons such as gasoline, as well as in other oxidizable organic substances.

In the claims, the expression "a plurality of molecules of compounds, each containing a carbonyl group and at least one being an isonitroso ketone" is intended to cover the same or similar compounds, in which case all of the compounds are isonitroso ketones; or different carbonyl compounds, at least one of which is an isonitroso ketone.

We claim:

1. An isonitroso ketone-polyamino compound reaction product having the general formula

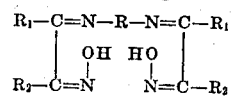

wherein $R_1$ are the same alkyl radicals, $R_2$ are the same radicals selected from the class consisting of H and alkyl and R is selected from the group consisting of ethylene and alkyl substituted ethylene.

2. The compound, di-(alpha isonitroso methyl ethyl ketone) ethylene diamine.

3. The compound, di-(alpha isonitroso methyl ethyl ketone) propylene diamine.

4. The compound, di-(alpha isonitroso methyl ethyl ketone) diethylene triamine.

5. The method of making a diketimine comprising mixing at least two molecular proportions of an alpha isonitroso ketone with one molecular proportion of an organic amine of the group consisting of an alkylene diamine and a polyalkylene polyamine having at least two primary amino groups attached directly to different carbon atoms.

6. The method of making a diketimine comprising mixing at least two molecular proportions of an alpha isonitroso ketone with one molecular proportion of an organic amine of the group consisting of an alkylene diamine and a polyalkylene polyamine having at least two primary amino groups attached directly to different carbon atoms and heating the mixture.

7. The method of making a diketimine comprising mixing in a solvent medium at least two molecular proportions of an alpha isonitroso ketone with one molecular proportion of an organic amine of the group consisting of an alkylene diamine and a polyalkylene polyamine having at least two primary amino groups attached directly to different carbon atoms.

8. The method of making a diketimine comprising mixing in a solvent medium at least two molecular proportions of an alpha isonitroso ketone with one molecular proportion of an organic amine of the group consisting of an alkylene diamine and a polyalkylene polyamine having at least two primary amino groups attached directly to different carbon atoms and heating the mixture.

MORRIS H. DASKAIS.
ELLIS K. FIELDS.